(12) United States Patent
O'Neill et al.

(10) Patent No.: US 11,836,822 B1
(45) Date of Patent: Dec. 5, 2023

(54) SYSTEMS AND METHODS FOR PROVIDING ROAMING PHYSICAL SECURITY INTELLIGENCE

(71) Applicant: ZeroFOX, Inc., Baltimore, MD (US)

(72) Inventors: Sowjanya Kasaraneni O'Neill, McLean, VA (US); Michael Morgan Price, Baltimore, MD (US)

(73) Assignee: ZeroFOX, Inc., Baltimore, MD (US)

( * ) Notice: Subject to any disclaimer, the term of this patent is extended or adjusted under 35 U.S.C. 154(b) by 0 days.

(21) Appl. No.: 17/663,068

(22) Filed: May 12, 2022

(51) Int. Cl.
*G06Q 50/26* (2012.01)
*H04M 1/72424* (2021.01)
*H04W 4/021* (2018.01)
*H04W 4/21* (2018.01)

(52) U.S. Cl.
CPC ...... *G06Q 50/265* (2013.01); *H04M 1/72424* (2021.01); *H04W 4/021* (2013.01); *H04W 4/21* (2018.02)

(58) Field of Classification Search
CPC ...... G06Q 50/265; H04W 4/21; H04W 4/021; H04M 1/72424
USPC ........................................................ 705/325
See application file for complete search history.

(56) References Cited

U.S. PATENT DOCUMENTS

| | | | | |
|---|---|---|---|---|
| 9,171,451 B2 * | 10/2015 | Blom | ...................... | H04W 4/90 |
| 9,466,197 B2 * | 10/2016 | Hildick-Pytte | ...... | G08B 25/009 |
| 9,836,939 B2 * | 12/2017 | Hildick-Pytte | ...... | G06Q 50/265 |
| 9,848,313 B1 * | 12/2017 | Cottle | .................... | G06F 40/30 |
| 11,615,102 B2 * | 3/2023 | Sriharsha | ............. | G06F 16/156 |
| | | | | 706/20 |
| 2004/0140899 A1 * | 7/2004 | Bouressa | ................. | G07C 9/27 |
| | | | | 340/4.6 |
| 2013/0218959 A1 * | 8/2013 | Sa | ......................... | G06Q 50/01 |
| | | | | 709/204 |
| 2013/0238518 A1 * | 9/2013 | Miller | ..................... | H04L 63/14 |
| | | | | 705/325 |
| 2014/0046863 A1 * | 2/2014 | Gifford | ................ | G06Q 50/265 |
| | | | | 705/325 |
| 2015/0317809 A1 * | 11/2015 | Chellappan | ............ | H04W 4/90 |
| | | | | 455/404.1 |
| 2015/0358794 A1 * | 12/2015 | Nokhoudian | ........ | G08B 25/005 |
| | | | | 455/404.1 |
| 2016/0005293 A1 * | 1/2016 | Yoo | ........................ | G16H 40/67 |
| | | | | 340/539.11 |
| 2016/0371966 A1 * | 12/2016 | P | ........................ | G01C 21/3415 |
| 2017/0024088 A1 * | 1/2017 | La Pean | .................. | H04W 4/90 |
| 2017/0191843 A1 * | 7/2017 | Yadav | ..................... | H04W 4/12 |
| 2017/0251347 A1 * | 8/2017 | Mehta | ..................... | H04W 4/90 |
| 2017/0329653 A9 * | 11/2017 | Li | ........................... | G06F 9/542 |
| 2018/0098206 A1 * | 4/2018 | Nguyen | .................. | H04W 4/90 |
| 2019/0020993 A1 * | 1/2019 | Nguyen | ................ | H04L 51/046 |
| 2019/0068632 A1 * | 2/2019 | Foster | ................. | H04L 63/1433 |
| 2019/0082312 A1 * | 3/2019 | Neybert | ............ | H04W 4/02 |
| 2019/0340906 A1 * | 11/2019 | Williams | ........... | G08B 21/0277 |
| 2020/0007677 A1 * | 1/2020 | Bjontegard | ........... | H04L 67/535 |
| 2020/0105113 A1 * | 4/2020 | Williams | ........... | G08B 21/0269 |
| 2020/0272670 A1 * | 8/2020 | Vaishnavi | ............. | G06F 16/958 |
| 2020/0296143 A1 * | 9/2020 | Mohamad Abdul | ........................ | |
| | | | | H04L 65/1073 |

(Continued)

OTHER PUBLICATIONS

International Search Report and Written Opinion for Application No. PCT/US2023/066896, dated Jun. 27, 2023, 9 pages.

*Primary Examiner* — Mong-Thuy T Tran
(74) *Attorney, Agent, or Firm* — DLA PIPER LLP (US)

(57) ABSTRACT

The disclosed systems and methods provide roaming physical security intelligence.

15 Claims, 9 Drawing Sheets

(56) References Cited

U.S. PATENT DOCUMENTS

| | | | |
|---|---|---|---|
| 2020/0304981 A1* | 9/2020 | Neybert | H04W 4/02 |
| 2021/0084451 A1* | 3/2021 | Williams | H04W 4/38 |
| 2021/0202067 A1* | 7/2021 | Williams | A61B 5/0022 |

* cited by examiner

*FIG. 5*

SYSTEMS AND METHODS FOR PROVIDING ROAMING PHYSICAL SECURITY INTELLIGENCE

BACKGROUND OF THE DISCLOSURE

Modern cyber threats have evolved alongside computer technology, and attackers can be expected to leverage whatever means are available in order to compromise or bypass defenses. For example, the development and expansion of social media has introduced significant information security risks to both individuals and organizations. These risks include target social-based cyber attacks (e.g., phishing attempts), fraud, impersonations, and social engineering. In addition, executives, VIPs, and other high-value targets can be particularly susceptible to attacks and disruptions. Attackers leverage executive and celebrity reputation and influence through social media impersonations, account takeovers, and business email compromise attacks to track unsuspecting victims into divulging sensitive information and even performing tasks. However, such high-value targets are also susceptible to physical risk from physical security events, such as shootings, riots, and other disruptions.

SUMMARY OF THE DISCLOSURE

According to one aspect of the present disclosure, a system for providing roaming physical security intelligence can include a server comprising one or more processors and a memory storing that, when executed, cause the one or more processors to perform a process. The process can be operable to ingest a plurality of events from a plurality of external data sources; detect a physical security event among the plurality of events; generate an alert based on the detected physical security event, the alert comprising content, location metadata, and at least one tag; and transmit the alert to a repository, wherein the alert is accessible by at least one user device to reference a device location against the location metadata.

In some embodiments, detecting the physical security event from the plurality of events can include a natural language processing technique and a machine learning technique. In some embodiments, generating the alert can include determining location metadata associated with the content and adding the location metadata to the alert. In some embodiments, ingesting the plurality of events from the plurality of external data sources comprises ingesting the plurality of events from at least one of a social network platform, an email account, a domain, a news source, a weather source, or a traffic source. In some embodiments, the one or more processors are further configured to, upon execution of the instructions, cause a check-in request to be displayed on the user device; and receive a check-in indication from the user device in response to a user making a selection on a user interface of the user device.

According to another aspect of the present disclosure, a system for providing roaming physical security intelligence can include a server comprising one or more processors and a memory storing that, when executed, cause the one or more processors to perform a process. The process can be operable to ingest a plurality of events from a plurality of external data sources; receive an alert from an analyst device, the alert comprising a detected physical security event from among the plurality of events, content, location metadata, and at least one tag; and transmit the alert to a repository, wherein the alert is accessible by at least one user device to reference a device location against the location metadata.

In some embodiments, receiving the alert can include receiving text describing an incident from the analyst device. In some embodiments, ingesting the plurality of events from the plurality of external data sources can include ingesting the plurality of events from at least one of a social network platform, an email account, a domain, a news source, a weather source, or a traffic source. In some embodiments, the one or more processors are further configured to, upon execution of the instructions, cause a check-in request to be displayed on the user device; and receive a check-in indication from the user device in response to a user making a selection on a user interface of the user device.

According to another aspect of the present disclosure, device for providing roaming physical security intelligence can include one or more processors and a memory storing instructions that, when executed, cause the one or more processors to perform a process. The process can be operable to transmit location data to a server; access a repository of alerts, each alert comprising a detected physical security event ingested from a plurality of external data sources; reference the location data against the repository to determine a match; and in response to determining the match, cause a notification to be displayed.

In some embodiments, transmitting the location data to the server is performed periodically on a polling interval. In some embodiments, the match can include a matching location and a matching time period. In some embodiments, the matching location can include a predefined radius around a geolocation of the user device. In some embodiments, the matching location can include a predefined future geolocation of the user device. In some embodiments, the notification can include at least one of a map of the location data of the user device and a textual description of the physical security event. In some embodiments, the notification can include a selectable option to request assistance. In some embodiments, the notification can include a distance between the physical security event and the device. In some embodiments, the notification can include a selectable option to check in.

BRIEF DESCRIPTION OF THE FIGURES

Various objectives, features, and advantages of the disclosed subject matter can be more fully appreciated with reference to the following detailed description of the disclosed subject matter when considered in connection with the following drawings, in which like reference numerals identify like elements.

The drawings are not necessarily to scale, or inclusive of all elements of a system, emphasis instead generally being placed upon illustrating the concepts, structures, and techniques sought to be protected herein.

FIG. 5 is an example user interface that can be used within the system of FIG. 1 according to some embodiments of the present disclosure.

DESCRIPTION

The following detailed description is merely exemplary in nature and is not intended to limit the invention or the applications of its use.

Embodiments of the present disclosure relate to providing roaming physical security intelligence, such as information on various events and incidents (shootings, riots, disruptions, etc.) that are happening near the geolocation of a device associated with an executive or other VIP. The disclosed embodiments provide near real-time threat intelligence on physical threats occurring globally. The disclosed system can alert organizations on events that impact public safety and cause disruption to an organizations' assets and people. Organizations can receive alerts on events occurring in real-time and obtain intelligence on past and future events based upon locations. Such alerts are generated based on a set of criteria like location tags and incident types. By tracking the geolocation of a certain device, such as an executive's cell phone, the disclosed system can match protected user locations against detected physical security incidents happening in the vicinity and push various notifications therefrom.

Figure 1:
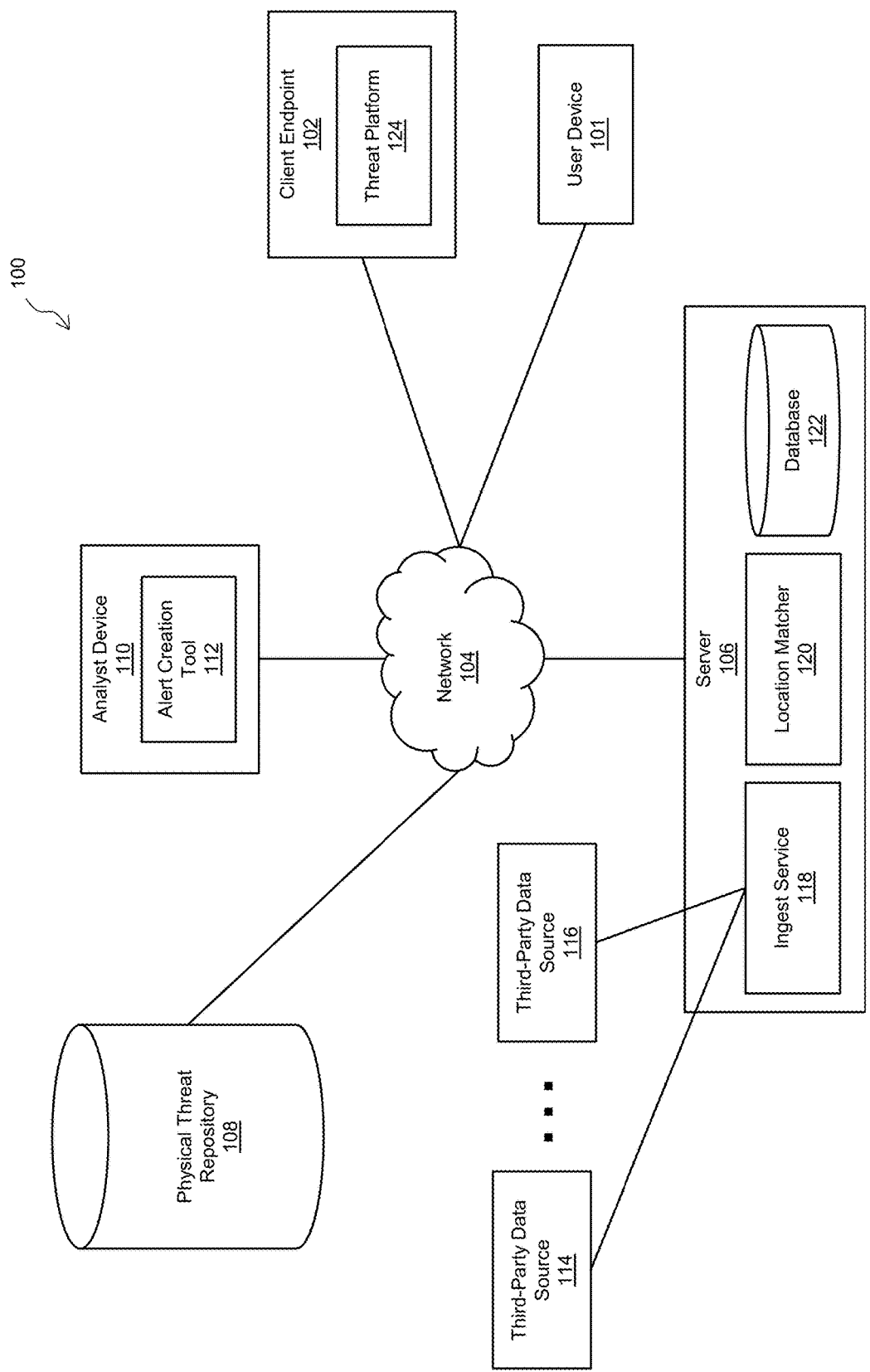
FIG. 1 is a block diagram of an example system for providing roaming physical security intelligence according to some embodiments of the present disclosure.

FIG. 1 is a block diagram of an example system 100 for providing roaming physical security intelligence according to some embodiments of the present disclosure. The system 100 can include a user device 101, one or more client endpoints 102, an analyst device 110, a physical threat repository 108, and a server 106, which are communicably coupled via a network 104. In some embodiments, the user device 101 can be associated with the client endpoint 102. For example, the client endpoint 102 may be a device in which an organization (e.g., company, school, firm, etc.) can access a threat platform 124 (e.g., via an application or web browser) to manage the security of their organization, while the user device 101 can be a device associated with a certain executive or VIP. In some embodiments, the system 100 can include any number of user device 101 and client endpoint 102 groupings because the system 100 may operate on behalf of numerous organizations that may include any number of user devices 101 and client endpoints 102. In addition, the analyst device 110 is associated with the organization managing the server 106 and is used by an analyst or other type of security-based employee. The analyst device 110 can include an alert creation tool 112 that allows analysts to receive, view, and analyze events ingested by the ingest service 118 (described in further detail below). In some embodiments, the alert creation tool 112 can be a private web browser extension. For example, the alert can include the event itself with various added tags and meta-data. Once created, the alert can be transmitted to the Physical threat repository 108, which is a full repository of physical security events ingested and alerted by the system 100. In some embodiments, the Physical threat repository 108 can be any type of data source (structured or unstructured), such as an Elastic database.

A user device 101, client endpoint 102, and/or an analyst device 110 can include one or more computing devices capable of receiving user input, transmitting and/or receiving data via the network 104, and or communicating with the server 106. In some embodiments, a user device 101, client endpoint 102, and/or an analyst device 110 can be a conventional computer system, such as a desktop or laptop computer. Alternatively, a user device 101, client endpoint 102, and/or an analyst device 110 can be a device having computer functionality, such as a personal digital assistant (PDA), a mobile telephone, a smartphone, or other suitable device. In some embodiments, a user device 101, client endpoint 102, and/or an analyst device 110 can be the same as or similar to the computing device 800 described below with respect to FIG. 8. In some embodiments, the system 100 can include any number of user devices 101, client endpoints 102, and/or analyst devices 110.

The network 104 can include one or more wide areas networks (WANs), metropolitan area networks (MANs), local area networks (LANs), personal area networks (PANs), or any combination of these networks. The network 104 can include a combination of one or more types of networks, such as Internet, intranet, Ethernet, twisted-pair, coaxial cable, fiber optic, cellular, satellite, IEEE 801.11, terrestrial, and/or other types of wired or wireless networks. The network 104 can also use standard communication technologies and/or protocols.

The server 106 may include any combination of one or more of web servers, mainframe computers, general-purpose computers, personal computers, or other types of computing devices. The server 106 may represent distributed servers that are remotely located and communicate over a communications network, or over a dedicated network such as a local area network (LAN). The server 106 may also include one or more back-end servers for carrying out one or more aspects of the present disclosure. In some embodiments, the server 106 may be the same as or similar to server 500 described below in the context of FIG. 5. In addition, the server 106 may be implemented on Amazon Web Services (AWS) and may include a plurality of EC2 (Amazon Elastic Compute Cloud) instances or other types of virtual machines, with each instance also including various node processes.

As shown in FIG. 1, the server 106 includes an ingest service 118, a location matcher 120, and a database 122. The ingest service 118 can be connected to various third-party data pipelines or data sources 114-116 and can monitor and extract events from these sources. The third-party data sources 114 and 116 can include various social network platforms (Twitter, Facebook, LinkedIn, etc.), email accounts, domains, news sources, and weather/traffic sources. From these sources, the ingest service 118 can pull various events such as posts, tweets, news articles, videos, photos, blog posts, files, apps, emails, domains, and the like. In some embodiments, events may be ingested based on a variety of criteria, such as geographic location, keyword mentions, authored by employees of a company, emails incoming to specific accounts, domains similar to a certain website, and the like. In some embodiments, the ingestion of events from the third-party data sources 114-116 is ongoing and occurs continuously over time. As events are ingested, the events can be analyzed to determine if they are worthy of transformation into an alert. Such analysis can be performed either manually by an analyst via analyst device 110 or automatically via the server 106. For example, the server 106 can utilize various natural language processing (NLP) techniques and algorithms to analyze ingested events and determine if they require an alert to be generated. In some embodiments, machine learning can be used to continuously improve and update the NLP and improve its alert determination. In some embodiments, a policy with three (although this is not limiting) rules can be utilized to generate alerts based on ingested events: (1) public safety—alerts on events that have an effect on the welfare and protection of the general public (e.g., shooting, rioting, violent car chase, etc.); (2) disruption—alerts on physical security incidents below the level of a public safety incident but that still causes disruption to the normal operations in the area (e.g., power outage, severe road closures, extreme weather, etc.); (3) observation—events that have not yet percolated to a physical security incident but may require vetting and monitoring for future developments.

In addition, the server 106 is configured to continuously receive location data from the user device 101. In some embodiments, the location data may be received for a certain amount of time. For example, a user may log into the threat platform 124 on the client endpoint 102 to define a period of time desired for tracking, such as when the executive associated with the user device 101 will be traveling. In other embodiments, the location data for the user device 101 may be tracked until a user on the client endpoint 102 (or the user device 101) disables the tracking. In some embodiments, the server 106 can receive the location data at various polling intervals (i.e., periodically), such as every thirty seconds, every five minutes, every hour, etc. In some embodiments, the polling interval can be set by a user on threat platform 124. The location data can be stored in the database 122. The location matcher 120 is configured to match client locations (i.e., from the user device(s) 101) against threat locations using geo-location data. In some embodiments, the location matcher 120 can utilize a queue or other correlated technique to detect device locations that are close to or relevant to events that have triggered alerts. Such a correlated technique can significantly improve the computational efficiency as comparing locations one-to-one can be expensive.

Figure 2:
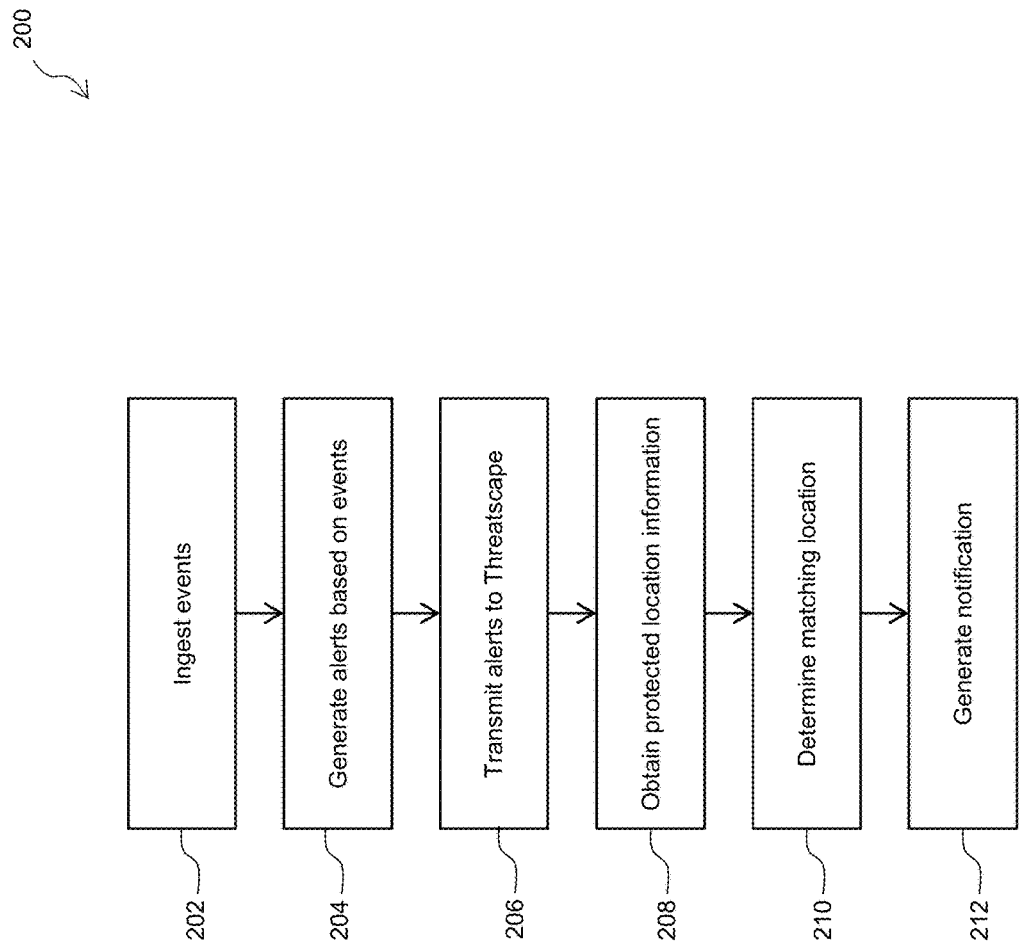
FIG. 2 is an example process for generating physical security notifications that can be performed within the system of FIG. 1 according to some embodiments of the present disclosure.

FIG. 2 is an example process 200 for generating physical security notifications that can be performed within the system of FIG. 1 according to some embodiments of the present disclosure. In some embodiments, some or all of process 200 can be performed by the server 106. At block 202, the server 106 (via the ingest service 118) ingests a plurality of events from the third-party data sources 114-116. As discussed above in relation to FIG. 1, the ingest service 118 can pull various events (e.g., posts, tweets, news articles, videos, photos, blog posts, files, apps, emails, domains, and the like) from various social network platforms, email accounts, domains, new sources, and weather/traffic sources. In addition, the ingestion of events from the third-party data sources 114-116 is ongoing and can occur continuously over time. The ingestion of events can be based on various criteria that attempts to detect and identify note-worthy events or security-risk events based on various criteria, such as geographic location, keyword mentions, authored by employees of a company, emails incoming to specific accounts, domains similar to a certain website, and the like. At block 204, the server 106 generates alerts based on the ingested events. In some embodiments, generating alerts from the ingested events can include performing analysis to determine if they are worthy of transformation into an alert. For example, a non-noteworthy event would be a mention of knives in relation to cooking. In some embodiments, such analysis can be performed using various natural language processing (NLP) techniques and algorithms to analyze the events. In some embodiments, machine learning can be used to continuously improve and update the NLP and improve its alert determination. Generating an alert can include adding various metadata and tags to the event that can be used for additional processing downstream.

At block 206, the server 106 transmits the generated alerts (and the accompany metadata and tags) to the Physical threat repository 108 for storage and maintenance. In this manner, the Physical threat repository 108 acts as a full repository of physical security events ingested and alerted by the server 106. Because the physical threat repository 108 can be a data source, such as an Elastic database, the alerts are then accessible for various other components within the system 100 (particularly the server 106) for additional analyses and efficient computations.

At block 208, the server 106 receives protected location information (i.e., location data from a protected user device 101). It is important to note that the receiving of the protected location information is received continuously and need not necessarily occur after blocks 202-206. In other words, the obtaining of the protected location information can occur at the same time as blocks 202-206. In some embodiments, the location data may be received for a certain amount of time and the location data for the user device 101 may be tracked until a user on the client endpoint 102 (or the user device 101) disables the tracking. In some embodiments, the server 106 can receive the location data at various polling intervals (i.e., periodically), such as every thirty seconds, every five minutes, every hour, etc. In some embodiments, the server 106 can store the location data in the database 122.

Figure 6A:
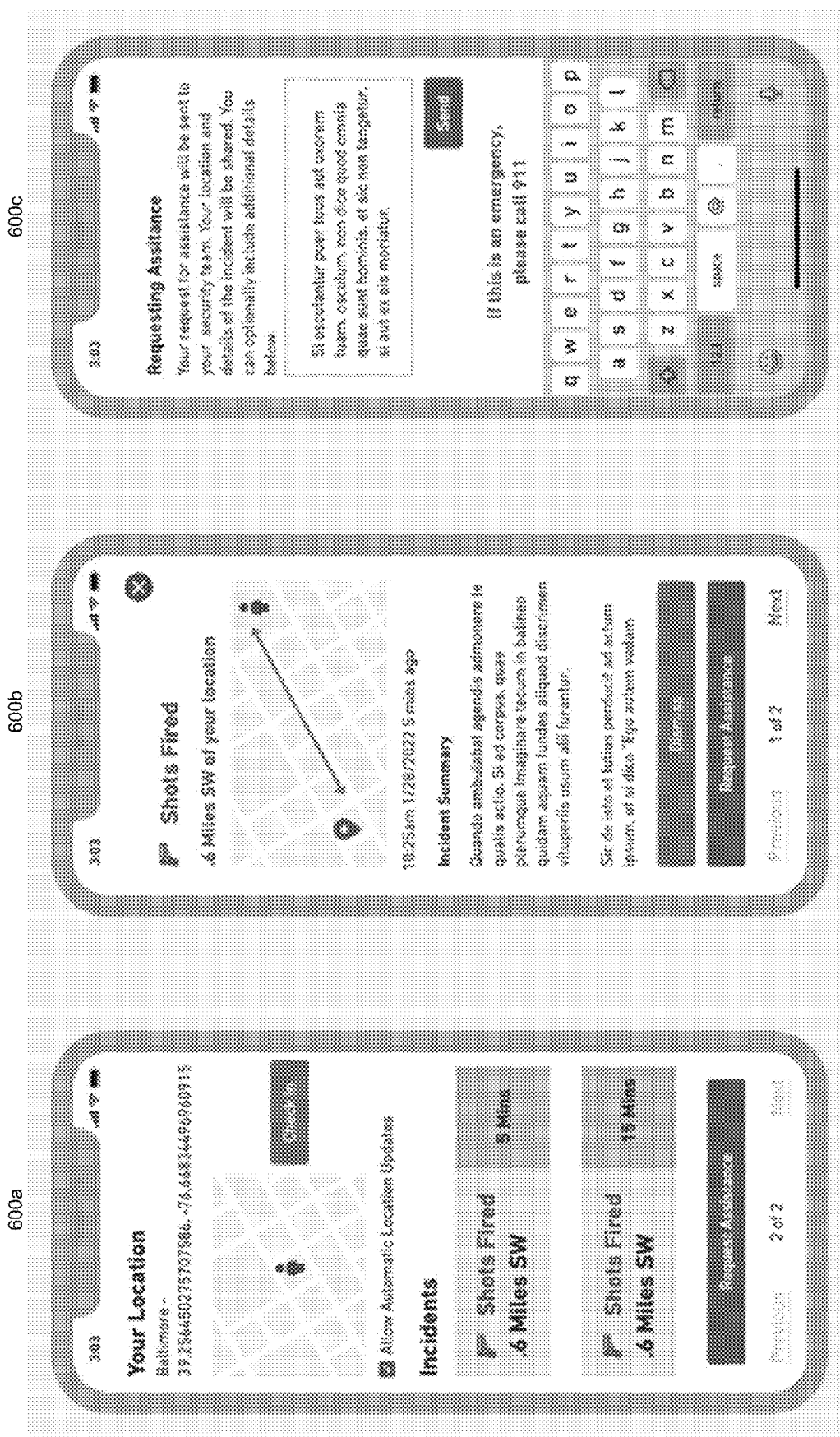
FIGS. 6A-6B are example user interfaces that can be used within the system of FIG. 1 according to some embodiments of the present disclosure.
Figure 6B:
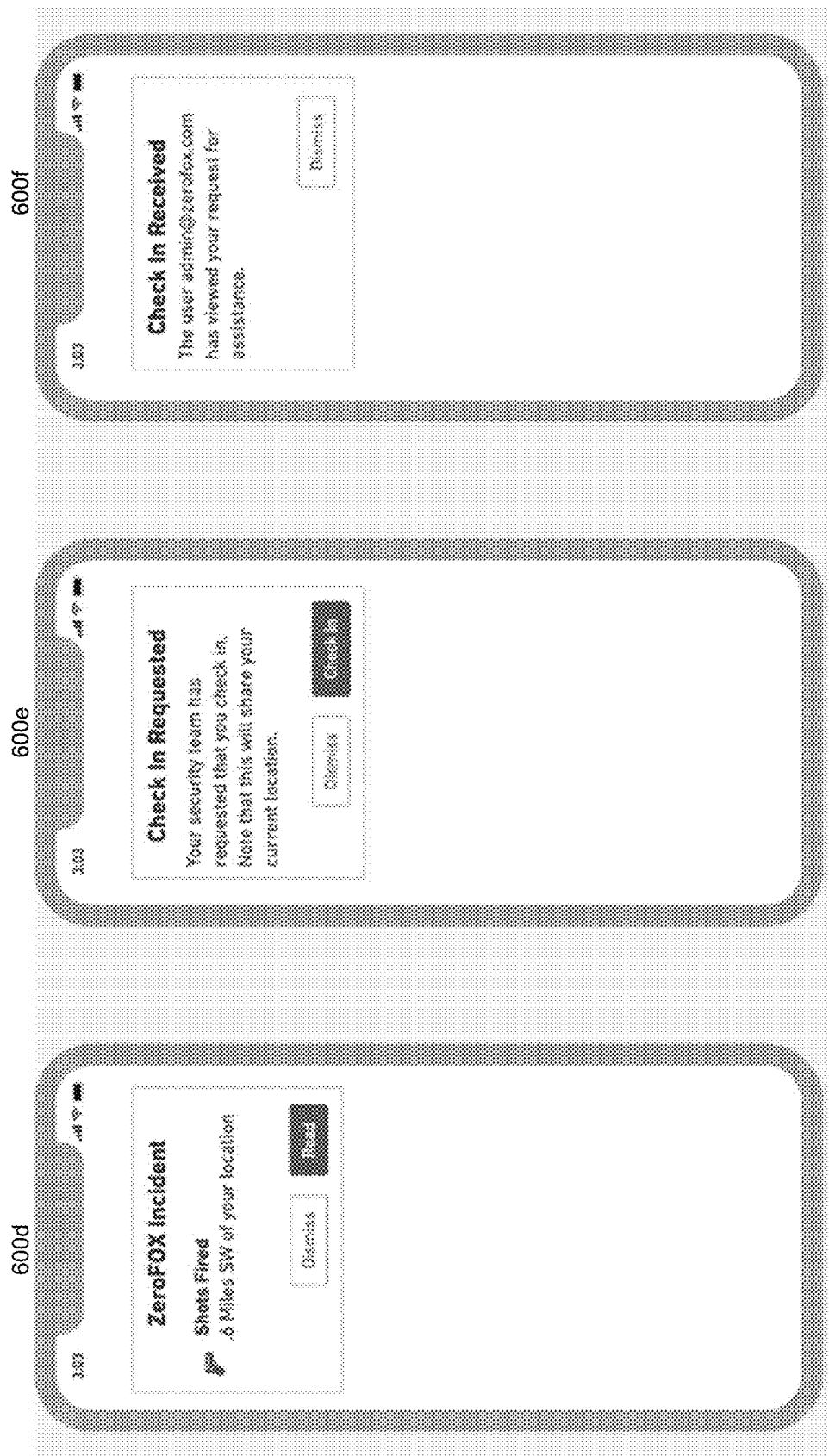

At block 210, the user device 101 determines a matching location. Depending on the interval in which the user device 101 transmits the protected location data to the server 106, the user device 101 can (e.g., via a mobile protection application installed on the device that accesses the device's location) access the Physical threat repository 108 and reference its location data against the alerts maintained there. In some embodiments, a match may include both a matching location and a matching time period. The matching location can be an alert with a location with a predefined radius of the geolocation of the user device 101. In some embodiments, the radius can be user-defined, such as via the threat platform 124 of the client endpoint 102. For example, a company may wish to identify alert of physical security events within ten miles of the account executive associated with the user device 101. In addition, the matching time period can generally be defined as three hours or less in the past from the time that the protected data was generated, although this is merely exemplary and not limiting. Additional details on determining a match are described with respect to FIG. 3. At block 212, in response to determining a match, the server 106 generates a notification and transmits the notification to the user device 101 and/or the client endpoint 102. In some embodiments, the notification can be displayed via the threat platform 124 or can be a push notification transmitted to the user device 101. Example notifications are shown in FIGS. 6A-6B.

Figure 3:
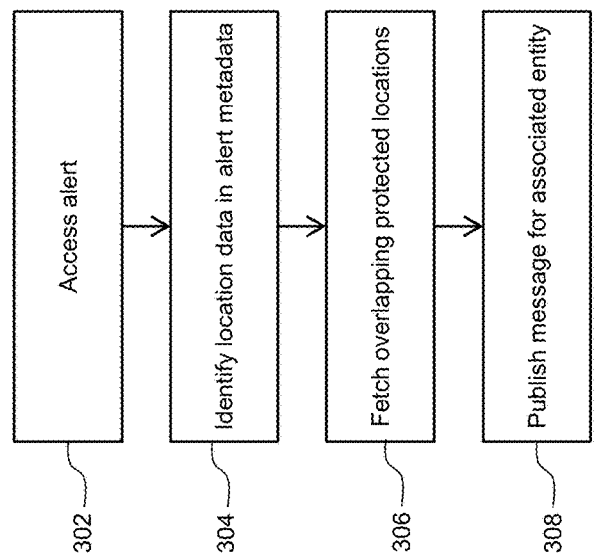
FIG. 3 is an example process for determining matching locations that can be performed within the system of FIG. 1 according to some embodiments of the present disclosure.

FIG. 3 is an example process 300 for determining matching locations that can be performed within the system of FIG. 1 according to some embodiments of the present disclosure. Process 300 can be performed by either the server 106 or the user device 101. At block 302, an alert is accessed by communicating with the Physical threat repository 108. At block 304, location data is identified within the alert's metadata. As discussed above in relation to FIGS. 1 and 2, when an alert is created from an event, various metadata and tags are added to the alert, such as location data. The location data can include city, zip code, state, country, and other information, as well as GPS coordinates. At block 306, protected locations that overlap with the location data from the alert's metadata are fetched. In embodiments where the user device 101 is handling the execution, the protected location may be limited to the geolocation of the device. In other embodiments, where the server 106 is handling the execution, there can be multiple protected locations, such as the location of multiple user devices 101 or other protected locations that can be defined within the threat platform 124. At block 308, a message is published for the entity associated with the protected location and transmitted to devices associated with the entity.

In some embodiments, determining a match may not necessarily correspond to the current geolocation of the user device 101 and may alternatively correspond to future locations. For example, a user via the threat platform 124 on the client endpoint 102 may define a route or final destination associated with a period of travel that the user device 101 will be embarking on. Therefore, notifications for relevant physical security incidents can be transmitted not just for locations that a protected user is at, but also for locations that the protected user will be at in the near future.

Figure 4:
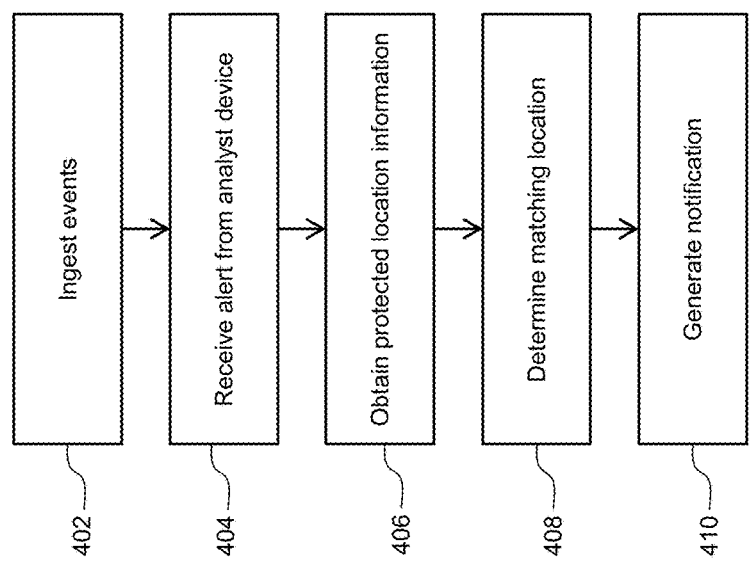
FIG. 4 is another example process for generating physical security notifications that can be performed within the system of FIG. 1 according to some embodiments of the present disclosure.

FIG. 4 is another example process 400 for generating physical security notifications that can be performed within the system of FIG. 1 according to some embodiments of the present disclosure. In some embodiments, some or all of process 200 can be performed by the server 106. Process 400 can be similar to process 200 with the exception that alerts are generated by analysts rather than automatically by the server 106. At block 402, the server 106 (via the ingest service 118) ingests a plurality of events from the third-party data sources 114-116. As discussed above in relation to FIG. 2, the ingest service 118 can pull various events (e.g., posts, tweets, news articles, videos, photos, blog posts, files, apps, emails, domains, and the like) from various social network platforms, email accounts, domains, new sources, and weather/traffic sources. In addition, the ingestion of events from the third-party data sources 114-116 is ongoing and can occur continuously over time and can be based on various criteria. At block 404, the server 106 can receive an alert from an analyst device. For example, after the events are ingested, they can be transmitted to (or at least accessible by) one or more analyst devices 110. An analyst is associated with the entity managing the physical security alerts. From the analyst device 110, the analyst can review the event and make a determination as to whether the event is severe enough to warrant generation of an alert. In some cases, analysts may determine that events are not worthy of being turned into alerts. However, in the case that they are determined to be severe enough, the analyst can utilize an alert creation tool 112. With the tool 112, the analyst can add various metadata and tags to the alert to enrich the original content. Then, the server receives the alert (e.g., the content of the event and the associated metadata) from the analyst device. It is important to note that not all events are subject to analyst validation for the generation of alerts/notifications. In some embodiments, this may occur in an automated pipeline from ingestion to alert notification. Validation can also occur after a notification due to the sensitivity of various events. For example, the time delay between detection and notification may be decreased because of severity or mentions of specific terms.

At block 406, the server 106 receives protected location information (i.e., location data from a protected user device 101). It is important to note that the receiving of the protected location information is received continuously and need not necessarily occur after blocks 402-404. In other words, the obtaining of the protected location information can occur at the same time as blocks 402-404. In some embodiments, the location data may be received for a certain amount of time and the location data for the user device 101 may be tracked until a user on the client endpoint 102 (or the user device 101) disables the tracking. In some embodiments, the server 106 can receive the location data at various polling intervals (i.e., periodically).

At block 408, the user device 101 determines a matching location. Depending on the interval in which the user device 101 transmits the protected location data to the server 106, the user device 101 can (e.g., via a mobile protection application installed on the device that accesses the device's location) access the Physical threat repository 108 and reference its location data against the alerts maintained there. In some embodiments, a match may include both a matching location and a matching time period. The matching location can be an alert with a location with a predefined radius of the geolocation of the user device 101. In some embodiments, the radius can be user-defined, such as via the threat platform 124 of the client endpoint 102. In addition, the matching time period can generally be defined as three hours or less in the past from the time that the protected data was generated, although this is merely exemplary and not limiting. At block 410, in response to determining a match, the server 106 generates a notification and transmits the notification to the user device 101 and/or the client endpoint 102. In some embodiments, the notification can be displayed via the threat platform 124 or can be a push notification transmitted to the user device 101. Example notifications are shown in FIGS. 6A-6B.

Figure 5:
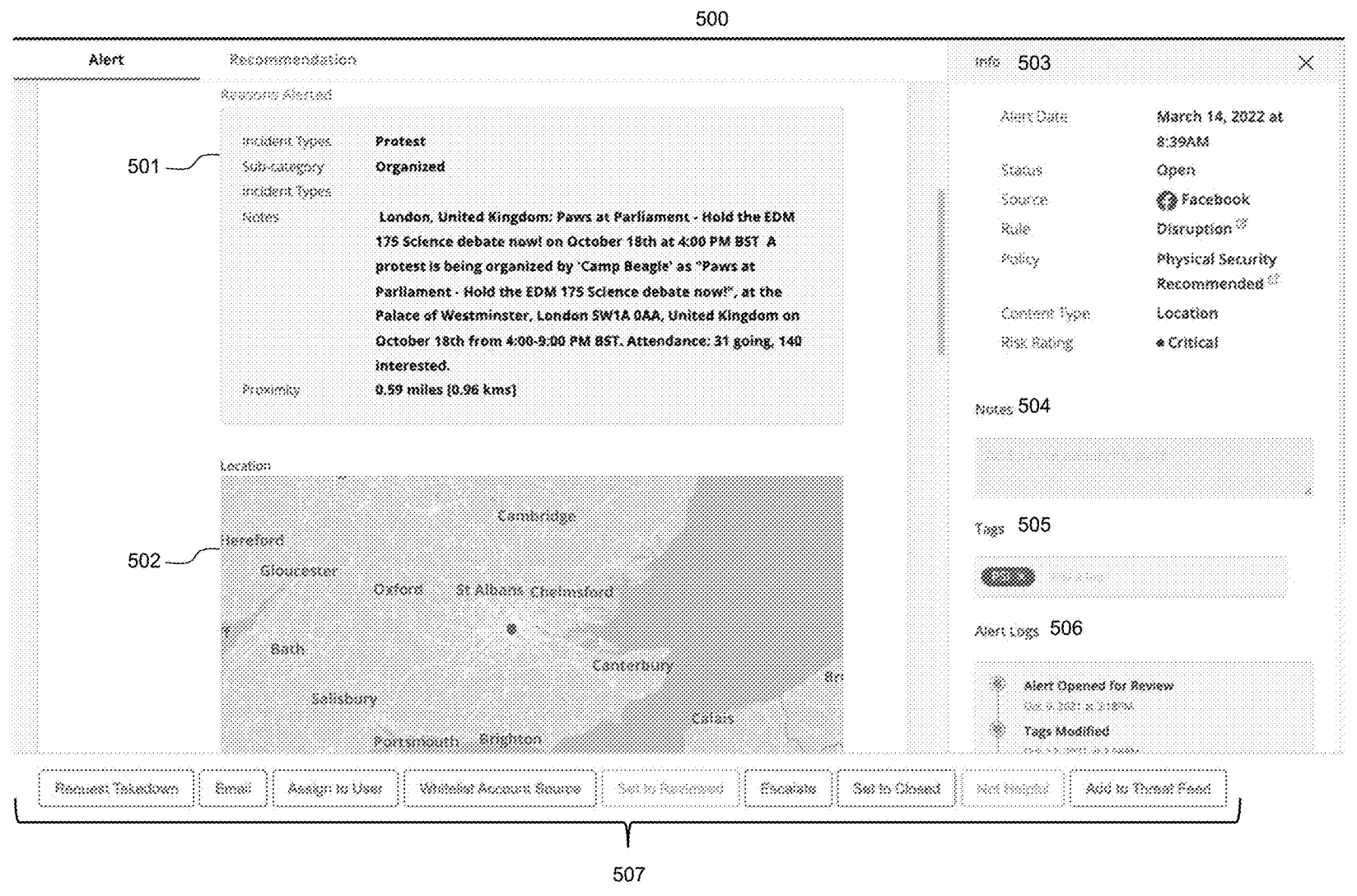

FIG. 5 is an example user interface 500 that can be used within the system of FIG. 1 according to some embodiments of the present disclosure. In some embodiments, the interface 500 is viewable on an analyst device 110, such as via the alert creation tool 112. The interface 500 is an exemplary view of an alert that was created (e.g., via the alert creation tool 112) based on an event. The interface 500 can include a "reasons alerted" section 501 that has various fields describing the event, such as an incident type (protest), a sub-category (organized protest), a proximity (.59 miles from the location of a certain protected entity's device), and a notes field. In some embodiments, the notes field can be manually filled out by an analyst. In some embodiments, the interface 500 can also include a map 502 illustrating the location of the threat. In some embodiments, the interface 500 further includes an informational section 503 that has various fields describing the alert, such as the date of the alert, the status (open or closed), the source (Facebook), the rule that triggered detection (disruption), the relevant policy of the protected entity (physical security), the content type (location), and a risk rating (critical). The risk rating can be manually defined by the analyst. Additionally, the interface 500 can include a fillable notes section 504, a tags section 505 where the analyst can add tags to the alert, and an alert log 506 that describes the timeline of the alert. Finally, the interface 500 can include an array 507 buttons to trigger certain actions, such as to request a takedown, send an email, assign to a specific user, whitelist the account source, escalate, set to closed, and/or add to threat feed. After the creation of this alert, the content, notes, and tags would be transmitted to and maintained by the Physical threat repository 108.

FIGS. 6A-6B are example user interfaces 600A-F that can be used within the system of FIG. 1 according to some embodiments of the present disclosure. The various user interfaces 600A-F can be displayed on the user device 101 and/or the client endpoint 102 (e.g., via threat platform 124) in response to a physical security threat having been detected that is relevant to a traveling protected entity associated with the user device 101, such as within a protection application (similar to or the same as the threat platform 124). Interface 600A can include a live map of the protected user of the device 101 and a description of the current location, such as a city name and/or GPS coordinates. In addition, there can be a "check in" button that the user can select and an option to toggle automatic location updates. Furthermore, the interface 600A can include a list of active nearby incidents/alerts; in this example, there was a shots fired incident fifteen minutes ago and five minutes ago. Each active alert that is listed is selectable by the user. Interface 600B can be triggered for display first in response to the user selecting an alert. The alert in 600B can include a textual description of the event (i.e., shots fired, a shooting occurred, etc.), information on the timing of the event (e.g., 10:25 am Jan. 28, 2022 5 mins ago), and a map illustrating both the location of the user device 101 and the event. Furthermore, the interface 600B can include selectable options/actions, such as "dismiss" and "request assistance." If the user requests assistance (either via interface 600A or interface 600B), interface 600C is displayed. The interface 600C includes a fillable form to type a message that will be sent to a security team associated with the system 100 that manages the security alerts.

Interface 600D is triggered for display in response to an alert being generated and subsequently matched with the location of the user device 101, such as via location matcher 120. The alert can include a brief textual description of the event that was alerted and selectable options for the user to choose. The options can be "dismiss" and "read." If the user selects dismiss, the alert is dismissed and no longer displayed (although is still selectable via interface 600A). If the user selects read, then the user enters the alert viewing mode and an interface similar to or the same as interface 600B is displayed. Interface 600e is another type of alert that can be transmitted for display to the protected user device 101. For example, an alert may have been generated, indicating a physical security threat to the user of protected user device 101, and sent to the client endpoint 102, the location of which is not monitored. A user accessing the threat platform 124 via the client endpoint 102 may request a "check in" from the protected user of user device 101, initiating the alert in interface 600E to be transmitted to the user device 101. The alert in interface 600E request a check in from the user of user device 101 and includes two selectable options: a dismiss option and a check in option. If the user selects the check in option, the interface 600F is displayed, indicating that the check in has been received.

Figure 7:
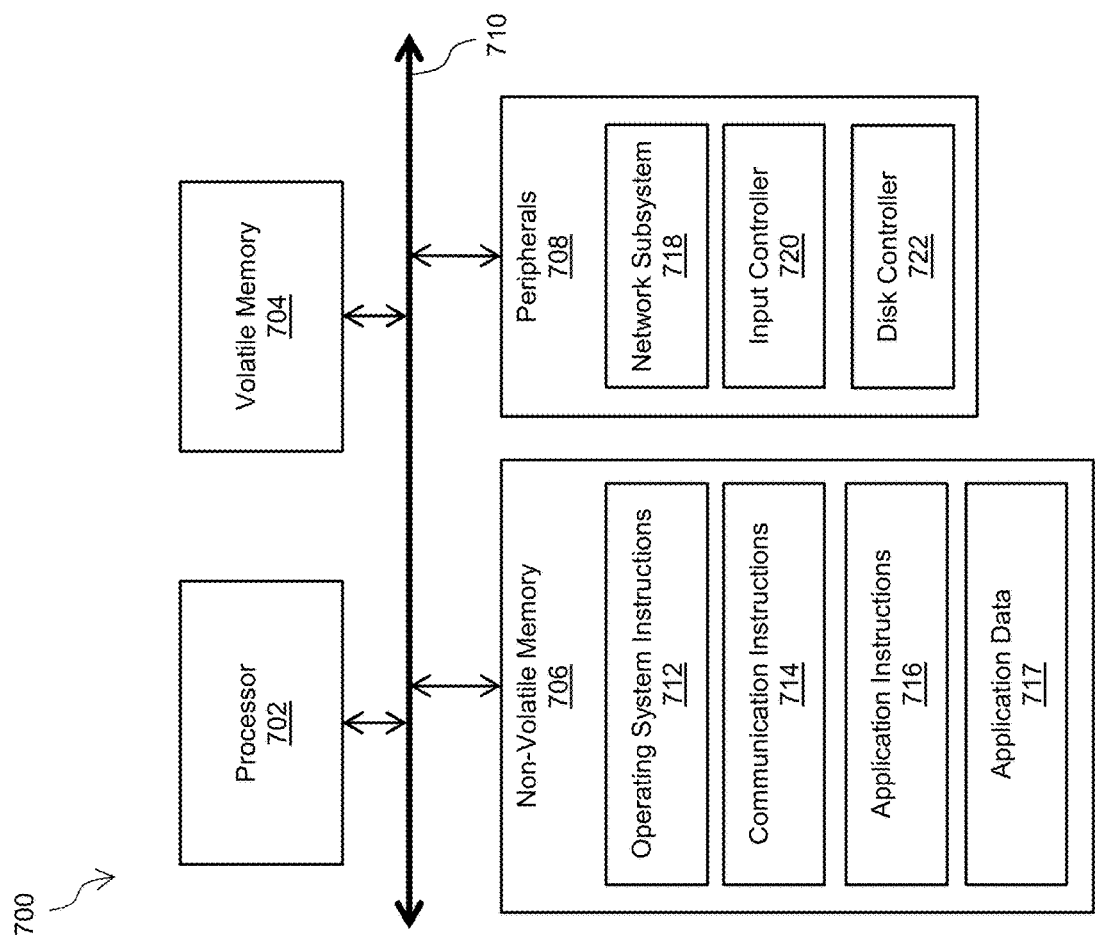
FIG. 7 is an example server device that can be used within the system of FIG. 1 according to an embodiment of the present disclosure.

FIG. 7 is a diagram of an example server device 700 that can be used within system 100 of FIG. 1. Server device 700 can implement various features and processes as described herein. Server device 700 can be implemented on any electronic device that runs software applications derived from complied instructions, including without limitation personal computers, servers, smart phones, media players, electronic tablets, game consoles, email devices, etc. In some implementations, server device 700 can include one or more processors 702, volatile memory 704, non-volatile memory 706, and one or more peripherals 708. These components can be interconnected by one or more computer buses 710.

Processor(s) 702 can use any known processor technology, including but not limited to graphics processors and multi-core processors. Suitable processors for the execution of a program of instructions can include, by way of example, both general and special purpose microprocessors, and the sole processor or one of multiple processors or cores, of any kind of computer. Bus 710 can be any known internal or external bus technology, including but not limited to ISA, EISA, PCI, PCI Express, USB, Serial ATA, or FireWire. Volatile memory 704 can include, for example, SDRAM. Processor 702 can receive instructions and data from a read-only memory or a random access memory or both. Essential elements of a computer can include a processor for executing instructions and one or more memories for storing instructions and data.

Non-volatile memory 706 can include by way of example semiconductor memory devices, such as EPROM, EEPROM, and flash memory devices; magnetic disks such as internal hard disks and removable disks; magneto-optical disks; and CD-ROM and DVD-ROM disks. Non-volatile memory 706 can store various computer instructions including operating system instructions 712, communication instructions 714, application instructions 716, and application data 717. Operating system instructions 712 can include instructions for implementing an operating system (e.g., Mac OS®, Windows®, or Linux). The operating system can be multi-user, multiprocessing, multitasking, multithreading, real-time, and the like. Communication instructions 714 can include network communications instructions, for example, software for implementing communication protocols, such as TCP/IP, HTTP, Ethernet, telephony, etc. Application instructions 716 can include instructions for various applications. Application data 717 can include data corresponding to the applications.

Peripherals 708 can be included within server device 700 or operatively coupled to communicate with server device 700. Peripherals 708 can include, for example, network subsystem 718, input controller 720, and disk controller 722. Network subsystem 718 can include, for example, an Ethernet of WiFi adapter. Input controller 720 can be any known input device technology, including but not limited to a keyboard (including a virtual keyboard), mouse, track ball, and touch-sensitive pad or display. Disk controller 722 can include one or more mass storage devices for storing data files; such devices include magnetic disks, such as internal hard disks and removable disks; magneto-optical disks; and optical disks.

Figure 8:
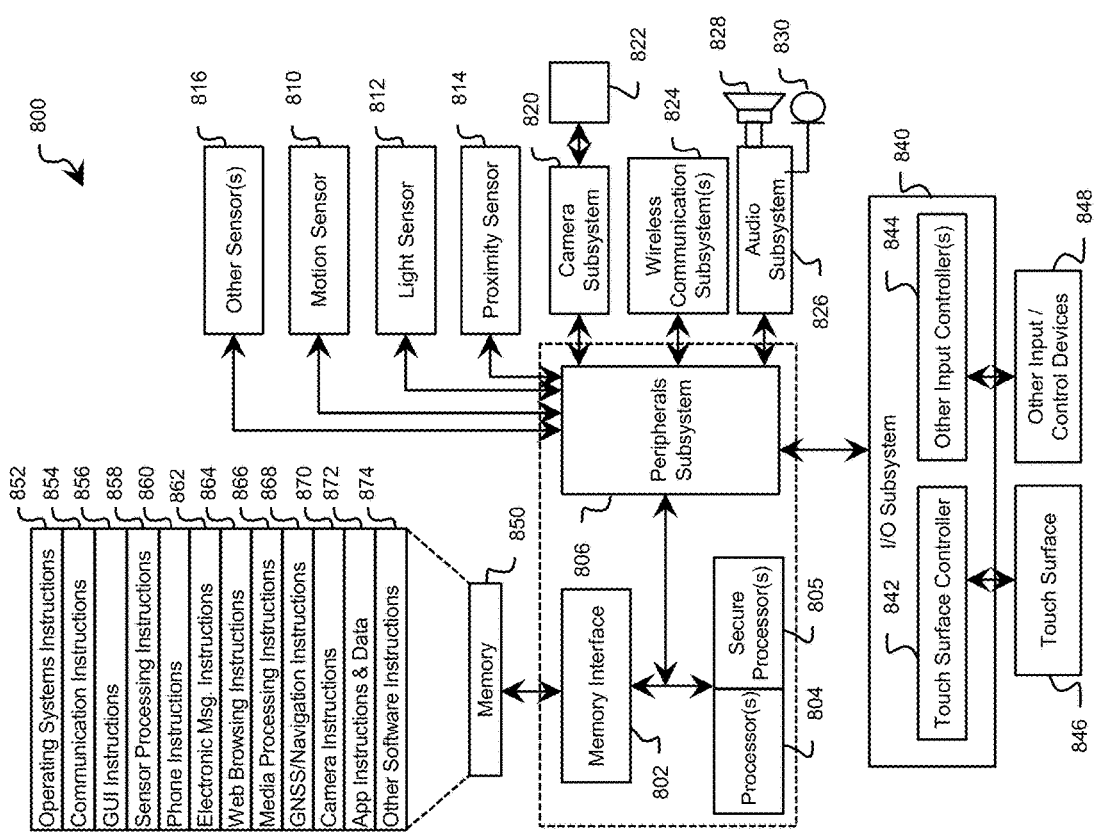
FIG. 8 is an example computing device that can be used within the system of FIG. 1 according to an embodiment of the present disclosure.

FIG. 8 is an example computing device that can be used within the system 100 of FIG. 1, according to an embodiment of the present disclosure. In some embodiments, device 800 can be endpoint 102. The illustrative user device 800 can include a memory interface 802, one or more data processors, image processors, central processing units 804, and/or secure processing units 805, and peripherals subsystem 806. Memory interface 802, one or more central processing units 804 and/or secure processing units 805, and/or peripherals subsystem 806 can be separate components or can be integrated in one or more integrated circuits. The various components in user device 800 can be coupled by one or more communication buses or signal lines.

Sensors, devices, and subsystems can be coupled to peripherals subsystem 806 to facilitate multiple functionalities. For example, motion sensor 810, light sensor 812, and proximity sensor 814 can be coupled to peripherals subsystem 806 to facilitate orientation, lighting, and proximity functions. Other sensors 816 can also be connected to peripherals subsystem 806, such as a global navigation satellite system (GNSS) (e.g., GPS receiver), a temperature sensor, a biometric sensor, magnetometer, or other sensing device, to facilitate related functionalities.

Camera subsystem 820 and optical sensor 822, e.g., a charged coupled device (CCD) or a complementary metal-oxide semiconductor (CMOS) optical sensor, can be utilized to facilitate camera functions, such as recording photographs and video clips. Camera subsystem 820 and optical sensor 822 can be used to collect images of a user to be used during authentication of a user, e.g., by performing facial recognition analysis.

Communication functions can be facilitated through one or more wired and/or wireless communication subsystems 824, which can include radio frequency receivers and transmitters and/or optical (e.g., infrared) receivers and transmitters. For example, the Bluetooth (e.g., Bluetooth low energy (BTLE)) and/or WiFi communications described herein can be handled by wireless communication subsystems 824. The specific design and implementation of communication subsystems 824 can depend on the communication network(s) over which the user device 800 is intended to operate. For example, user device 800 can include communication subsystems 824 designed to operate over a GSM network, a GPRS network, an EDGE network, a WiFi or WiMax network, and a Bluetooth™ network. For example, wireless communication subsystems 824 can include hosting protocols such that device 800 can be configured as a base station for other wireless devices and/or to provide a WiFi service.

Audio subsystem 826 can be coupled to speaker 828 and microphone 830 to facilitate voice-enabled functions, such as speaker recognition, voice replication, digital recording, and telephony functions. Audio subsystem 826 can be configured to facilitate processing voice commands, voice-printing, and voice authentication, for example.

I/O subsystem 840 can include a touch-surface controller 842 and/or other input controller(s) 844. Touch-surface controller 842 can be coupled to a touch-surface 846. Touch-surface 846 and touch-surface controller 842 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch-surface 846.

The other input controller(s) 844 can be coupled to other input/control devices 848, such as one or more buttons, rocker switches, thumb-wheel, infrared port, USB port, and/or a pointer device such as a stylus. The one or more buttons (not shown) can include an up/down button for volume control of speaker 828 and/or microphone 830.

In some implementations, a pressing of the button for a first duration can disengage a lock of touch-surface 846; and a pressing of the button for a second duration that is longer than the first duration can turn power to user device 800 on or off. Pressing the button for a third duration can activate a voice control, or voice command, module that enables the user to speak commands into microphone 830 to cause the device to execute the spoken command. The user can customize a functionality of one or more of the buttons. Touch-surface 846 can, for example, also be used to implement virtual or soft buttons and/or a keyboard.

In some implementations, user device 800 can present recorded audio and/or video files, such as MP3, AAC, and MPEG files. In some implementations, user device 800 can include the functionality of an MP3 player, such as an iPod™. User device 800 can, therefore, include a 36-pin connector and/or 8-pin connector that is compatible with the iPod. Other input/output and control devices can also be used.

Memory interface 802 can be coupled to memory 850. Memory 850 can include high-speed random access memory and/or non-volatile memory, such as one or more magnetic disk storage devices, one or more optical storage devices, and/or flash memory (e.g., NAND, NOR). Memory 850 can store an operating system 852, such as Darwin, RTXC, LINUX, UNIX, OS X, Windows, or an embedded operating system such as VxWorks.

Operating system 852 can include instructions for handling basic system services and for performing hardware dependent tasks. In some implementations, operating system 852 can be a kernel (e.g., UNIX kernel). In some implementations, operating system 852 can include instructions for performing voice authentication.

Memory 850 can also store communication instructions 854 to facilitate communicating with one or more additional devices, one or more computers and/or one or more servers. Memory 850 can include graphical user interface instructions 856 to facilitate graphic user interface processing; sensor processing instructions 858 to facilitate sensor-related processing and functions; phone instructions 860 to facilitate phone-related processes and functions; electronic messaging instructions 862 to facilitate electronic messaging-related process and functions; web browsing instructions 864 to facilitate web browsing-related processes and functions; media processing instructions 866 to facilitate media processing-related functions and processes; GNSS/Navigation instructions 868 to facilitate GNSS and navigation-related processes and instructions; and/or camera instructions 870 to facilitate camera-related processes and functions.

Memory 850 can store application (or "app") instructions and data 872, such as instructions for the apps described above in the context of FIGS. 1-6 and for modules 108-118. Memory 850 can also store other software instructions 874 for various other software applications in place on device 800.

The described features can be implemented in one or more computer programs that can be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions can include, by way of example, both general and special purpose microprocessors, and the sole processor or one of multiple processors or cores, of any kind of computer. Generally, a processor can receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user may provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail may be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

The invention claimed is:

1. A system for providing roaming physical security intelligence comprising:
a server comprising one or more processors and a memory storing instructions that, when executed, cause the one or more processors to:
ingest a plurality of events from a plurality of external data sources, the plurality of external data sources comprising at least one of a social network platform or a news source;
detect, via a natural language processing technique, a physical security event among the plurality of events;
generate an alert based on the detected physical security event, the alert comprising content, location metadata, and at least one tag; and
transmit the alert to a repository, wherein the repository is directly accessible by a plurality of user devices, wherein the repository is configured to:
receive a request to reference a device location against the location metadata from at least one of the plurality of user devices; and
provide access to the location metadata for the at least one of the plurality of user devices.

2. The system of claim 1, wherein generating the alert comprises determining location metadata associated with the content and adding the location metadata to the alert.

3. The system of claim 1, wherein the one or more processors are further configured to, upon execution of the instructions:
cause a check-in request to be displayed on the user device; and
receive a check-in indication from the user device in response to a user making a selection on a user interface of the user device.

4. A system for providing roaming physical security intelligence comprising:
a server comprising one or more processors and a memory storing instructions that, when executed, cause the one or more processors to:
ingest a plurality of events from a plurality of external data sources, the plurality of external data sources comprising at least one of a social network platform or a news source;
receive an alert from an analyst device, the alert comprising a detected physical security event from among the plurality of events, content, location metadata, and at least one tag; and transmit the alert to a repository, wherein the alert is accessible by at least one user device to reference a device location against the location metadata.

5. The system of claim 4, wherein receiving the alert comprises receiving text describing an incident from the analyst device.

6. The system of claim 4, wherein the one or more processors are further configured to, upon execution of the instructions:

cause a check-in request to be displayed on the user device; and receive a check-in indication from the user device in response to a user making a selection on a user interface of the user device.

7. A user device for providing roaming physical security intelligence comprising:

one or more processors and a memory storing instructions that, when executed, cause the one or more processors to:

transmit location data to a server;

access a repository of alerts, each alert comprising a detected physical security event ingested from a plurality of external data sources;

reference the location data against the repository to determine a match; and in response to determining the match, cause a notification to be displayed, the notification comprising a map of the location data of the user device.

8. The device of claim 7, wherein transmitting the location data to the server is performed periodically on a polling interval.

9. The device of claim 7, wherein the match comprises a matching location and a matching time period.

10. The device of claim 7, wherein the matching location comprises a predefined radius around a geolocation of the user device.

11. The device of claim 7, wherein the matching location comprises a predefined future geolocation of the user device.

12. The device of claim 7, wherein the notification comprises a textual description of the physical security event.

13. The device of claim 7, wherein the notification comprises a selectable option to request assistance.

14. The device of claim 7, wherein the notification comprises a distance between the physical security event and the device.

15. The device of claim 7, wherein the notification comprises a selectable option to check in.

* * * * *